United States Patent
Nesson et al.

[11] 3,797,026
[45] Mar. 12, 1974

[54] DEVICE FOR USE WITH SELF-DEVELOPING FILM

[75] Inventors: Israel Nesson, Fair Lawn; Robert G. Palmer, Wayne; Edwin E. Faris, Wyckoff; Charles J. Hertling, Bloomfield, all of N.J.

[73] Assignee: Berkey Photo, Inc., Paramus, N.J.

[22] Filed: Dec. 13, 1972

[21] Appl. No.: 314,725

Related U.S. Application Data

[63] Continuation-in-part of Ser. No. 229,942, Feb. 28, 1972, Pat. No. 3,130,065.

[52] U.S. Cl. ................................................ 354/85
[51] Int. Cl. ........................................... G03b 17/52
[58] Field of Search ............................ 95/13, 89 R

[56] References Cited
UNITED STATES PATENTS

| | | | |
|---|---|---|---|
| 3,730,065 | 5/1973 | Nesson et al. | 95/13 |
| 3,641,908 | 2/1972 | Eloranta | 95/89 R |
| 3,165,039 | 1/1965 | Downey | 95/13 |

Primary Examiner—Joseph F. Peters
Assistant Examiner—Alan Mathews
Attorney, Agent, or Firm—Neuman, Williams, Anderson & Olson

[57] ABSTRACT

A device is provided for use in a camera utilizing self-developing film. The film in question comprises a rupturable pod of processing liquid which is sandwiched between a pair of photographic sheets. Attached to the exterior of one of the sheets and disposed adjacent the leading end thereof is an elongated removable feeder tab. The device is disposed within the camera and includes a pair of elongated spreader members which are biased towards one another to assume a substantially superposed relation and define an longated predetermined minimum gap through which the photographic sheets and the pod, when in a collapsed state, are caused to move. As the film moves through the gap, the pos is ruptured and the processing liquid uniformly spread between the sheets. Compression means are disposed adjacent the infeed side of the gap and provide uninterrupted pressure on the opposite marginal segments of the film sheets. Compressive pressure is continuously exerted along a wide uninterrupted band on opposite marginal segments of the film from a location substantially upstream of the spreader members into the gap between the spreader members and thereby confining the spread of the processing liquid to between the compressed wide bands formed on the marginal segments. Portions of the compression means extend into the gap and engae the film while the latter is moving therethrough. The device includes a guide means which is disposed adjacent the infeed side of the gap and directs the leading end of the film into the gap. The feeder tab carried by one of the photographic sheets is positioned over the guide member so as to circumvent the gap. The feeder tab projects outwardly from the camera housing and, as it is manually pulled therefrom, the feeder tab will cause the leading ends of the photographic sheets to pass through the gap and extend outwardly from the camera housing whereupon they may be grasped for manual pulling of the remainder of the film through the gap.

2 Claims, 9 Drawing Figures

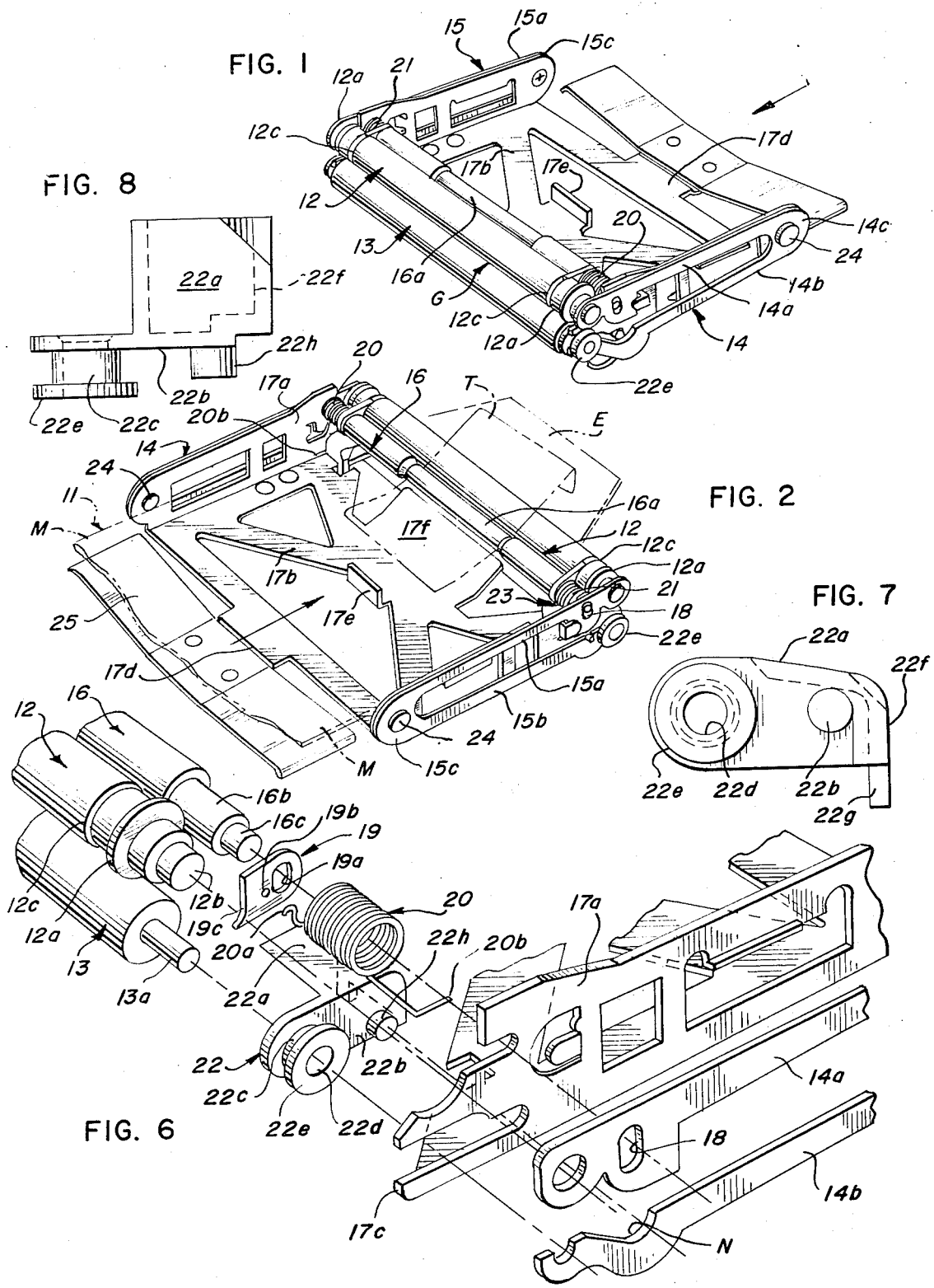

DEVICE FOR USE WITH SELF-DEVELOPING FILM

The instant application is a continuation-in-part of applicants' pending application, Ser. No. 229,942, filed Feb. 28, 1972. Now U.S. Pat 3,730,065.

BACKGROUND OF THE INVENTION

Various devices have heretofore been provided for spreading the processing liquid between the photographic sheets of self-developing flim upon the latter being moved a predetermined distance through a camera. Because of certain design characteristics, however, the devices have been beset with one or more of the following shortcomings: (a) they were of a complex and costly construction; (b) the spreader members were ineffective in uniformly spreading the processing liquid between the photographic sheets once the pod containing the liquid was ruptured; (c) leakage of the processing liquid occurred along the margins of the film as the latter was moved through the device; (d) the film frequently became jammed in the device; and (e) moving of the film through the device was an awkward manual manipulation and often resulted in a failure to evenly develop the film.

SUMMARY OF THE INVENTION

Thus, it is an object of this invention to provide a device of the type described which avoids the shortcomings aforenoted.

It is a further object of the invention to provide a device of the type described which is of simple, compact and sturdy construction and may be readily disposed within a camera utilizing self-developing film without causing the size of the camera to be inordinately enlarged, or interfering with the normal operation of such a camera.

It is a further object of the invention to provide a device of the type described which requires little or no maintenance and is readily capable of handling either black and white or color self-developing film presently available on the market.

It is a still further object of the invention to provide a device of the type described wherein continuous wide bands are impressed along the marginal segments of the film as the latter is moved between the spreader members and, thus, spreading of the processing liquid is effectively confined between the marginal wide bands.

Further and additional objects will appear from the description, accompanying drawings, and appended claims.

In accordance with one embodiment of the invention, a device of the type described, is provided which includes a carriage, a pair of elongated spreader members arranged in a substantially superposed relation and defining an elongated predetermined minimum gap, and spring means carried by the carriage and on which the ends of the spreader members are mounted. The spring means bias the spreader members toward oen another to form the minimum gap. An elongated guide means is carried by the carriage and is disposed adjacent the infeed side of the gap. The guide means is adapted to direct the leading end of the film into the gap and at the same time cause a feeder tab, which is normally a part of the film, to be diverted so that it will circumvent the gap. A spring biased compression unit is provided which has first portions thereof mounted on the carriage adjacent the infeed side of the gap, and second portions carried adjacent the ends of the guide means and cooperating with the first portions to compress the opposite marginal segments of the photographic sheets of the film to form continuous wide bands as the film sheets move through the gap between the spreader members. As the film sheets are moved through the gap, the pod of processing liquid, which is sandwiched between the sheets, is ruptured. The continuous wide bands formed in the marginal segments of the film sheets cause the spreading of the processing liquid to be confined therebetween.

A part of each second portion of the compression unit is disposed within the gap and is adapted to resiliently engage the marginal segments of the film sheets as they move between the spreader members.

DESCRIPTION

For a more complete understanding of the invention reference should be made to the drawings wherein:

FIG. 1 is a perspective view of one form of the improved device taken from the discharge side of the spreader members.

FIG. 2 is similar to FIG. 1, but taken from the infeed side of the spreader members and showing in phantom, a portion of the self-developing film moving through the device in the direction of the arrow.

FIG. 6 is an enlarged, fragmentary perspective view of the corner of the deivce of FIG. 1 and showing the components thereof in exploded relation.

FIG. 7 is an enlarged side elevational view of a component of the compression means.

FIG. 8 is a top view of the component of FIG. 7.

Figure 3:
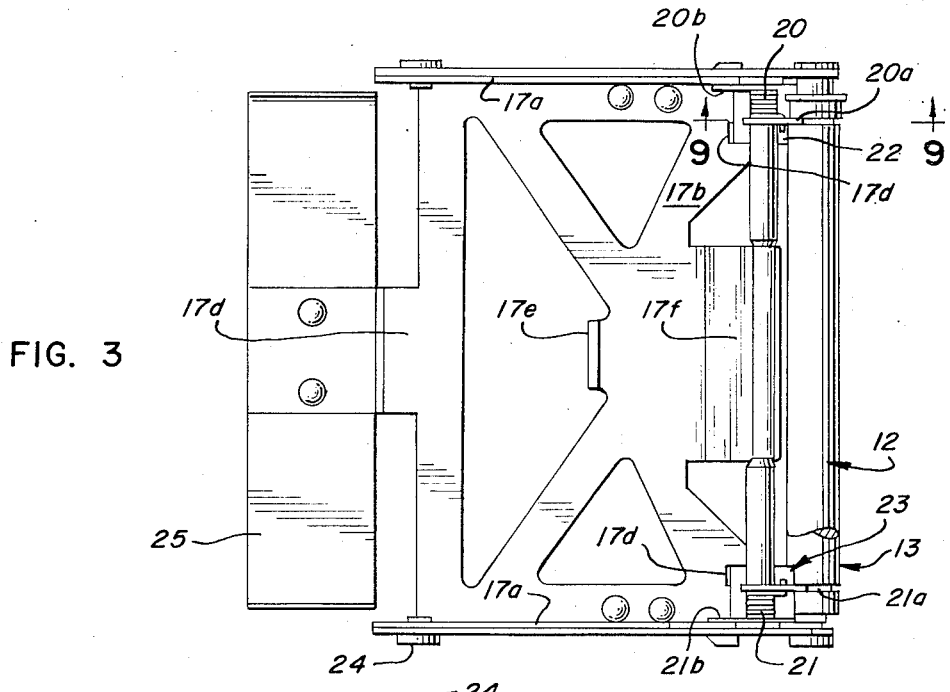
FIG. 3 is a top view of the device of FIG. 1.
Figure 4:
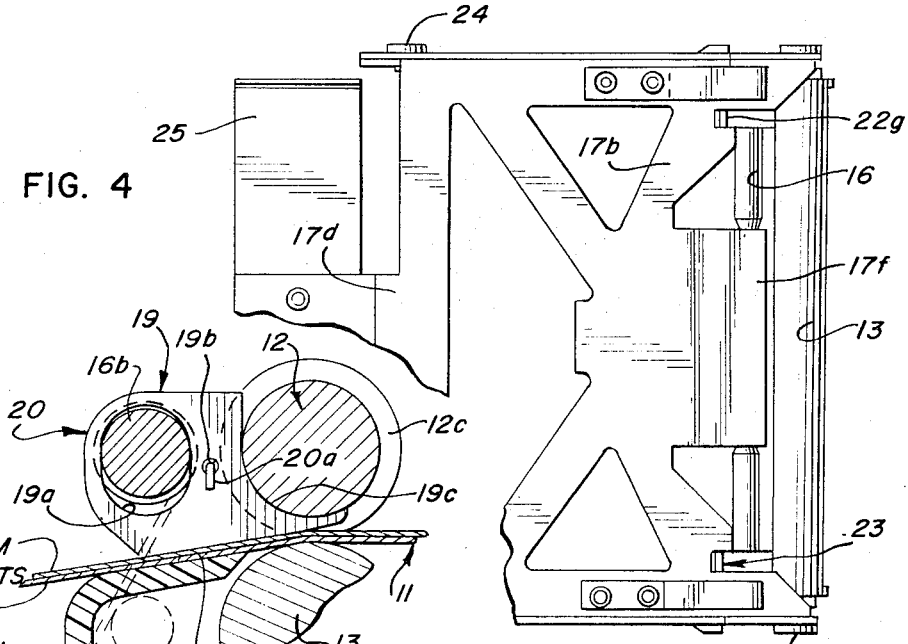
FIG. 4 is a bottom view of the device of FIG. 1.

Referring now to the drawings and more particularly to FIGS. 1 and 2, one form of the improved device 10 is shown which is adapted to be used in a camera, not shown, utilizing self-developing film 11, the latter being shown in phantom in FIG. 2. A camera of the type in question may be that presently marketed by Polaroid Coporation of Cambridge, Massachusetts, under the name "Colorpack II Land Camera." It is to be understood, of course, that device 10 is not limited for use in this precise camera, but may be utilized in other types of cameras utilizing the self-developing film, whether the latter be black and white or color. The film 11, adapted for use with the device in question, consists of sets of superposed sheets of film arranged in stacked relation within a suitable rectangular cartridge, not shown. The cartridge is sized so that it may be readily slipped into a rear compartment of the camera when the latter is to be loaded or reloaded. The film cartridge may be of a type presently marketed by the Polaroid Corporation under the name "Polaroid 3000 Speed, Type 107." Each set of film sheets used with the device 10 includes a rupturable pod of processing liquid which is sandwiched between a pair of photographic sheets. Removably attached to the exposed surface of the uppermost film sheet, is an elongated feeder tab T, which, when manually pulled, causes the leading edge E of the superposed film sheets to be properly positioned initially in the device so that said leading edge will be exposed outside the camera housing and adapted to be subsequently pulled manually in a manner to be hereinafter described.

Device 10, as illustrated, includes a pair of elongated spreader members 12 and 13 which take the form of rollers, disposed in superposed proximate relation. The term "superposed," as used herein, is intended to cover the rollers being disposed in side-by-side or coextensive relation. The rollers are biased towards one another by a pair of substantially U-shaped springs 14 and 15. Each spring is of like construction and is formed of a suitable resilient material for exerting thhe necessary biasing force.

Roller 12 is provided at opposite ends thereof with annular shoulders 12a which are adapted to tangentially engage the periphery of roller 13 and form an elongated gap G of predetermined minimum dimensions. The outer surfaces of the rollers are smooth, so as not to mar or deface the film sheets as they move through the gap. Opposite ends of the rollers are provided with axially extending spindles 12b and 13a, see FIG. 6, which are adapted to be journaled in the corresponding ends of legs 14a and b and 15a and b of the springs 14 and 15.

Roller 12 is also provided with a pair of annular grooves or recesses 12c which are disposed inwardly of, but adjacent to, the shoulders 12a. The function of the grooves will be discussed more fully hereinafter.

Positioned in close proximity to the infeed side of the gap G, is an elongated guide means which is shown as a roller 16. The roller 16 is supported at its opposite ends by upright side flanges 17a of a carriage 17, which will subsequently be described in greater detail. The guide roller 16 is substantially coextensive with the rollers 12 and 13 and is arranged in substantially parallel relation therewith. The central portion 16a of roller 16 is recessed slightly. The opposite ends of roller 16 are each provided with a recessed bearing surface 16b and an axially-extending spindle 16c, see FIG. 6. The spindles 16c are journaled in suitable openings formed in the carriage side flanges 17a. The distal ends of the spindles 16c terminate within elongated slots 18 formed in the corresponding upper legs 14a and 15a of the springs 14 and 15.

The bearing surfaces 16b of guide roller 16 are embraced by coil springs 20 and 21. The springs 20 and 21 are of like construction and each has a hook-shaped end portion 20a or 21a which extends forwardly and upwardly from the bearing surface 16b, see FIGS. 6 and 9. The opposite end portion 20b or 21b of spring 20 or 21, extends rearwardly and downwardly from the bearing surface 16b and rests upon a base section 17b forming a part of the carriage 17, see FIG. 9.

Figure 9:
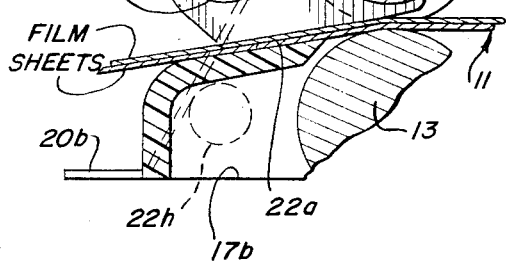
FIG. 9 is an enlarged fragmentary sectional view taken along line 9—9 of FIG. 3 and showing the compression unit acting upon the marginal portion of the film.
Figure 5:
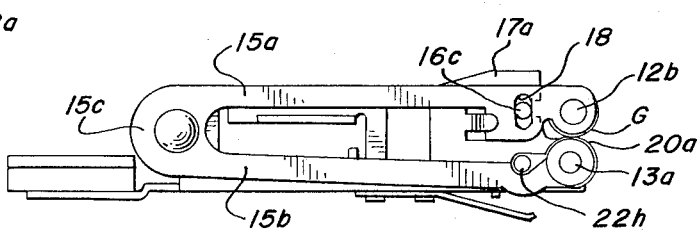
FIG. 5 is a side elevational view of the device of FIG. 1 and with the discharge end thereof disposed to the right.

In addition to the springs 20 and 21 an elongated pawl 19 is positioned on the bearing surface 16b at opposite ends of roller 16. Each pawl is of like construction and as seen in FIGS. 6 and 9, is provided with an elongated opening 19a through which the bearing surface 16b extends. The elongated configuration of opening 19a provides a slip fit permitting the pawl to move upwardly relative to bearing surface 16b, so as to compensate for the marginal thickness of the film sheets passing between the spreader members 12 and 13. A small aperture 19b is also formed in the pawl to accommodate the hook-shaped end portion 20a or 21a of the spring 20 or 21. The springs bias the pawls in a downward direction. The forward end of the pawl 19 is provided with a concave surface 19c which partially conforms to the base surface configuration of the groove 12c formed at each end of spreader roller 12. The lower portion of the surface 19c is disposed within the gap G formed between the spreader members 12 and 13.

The underside of each pawl is elongated and substantially flat. As seen in FIG. 9, the broad, substantially flat underside of each pawl coacts with a component 22 or 23, which is fixedly disposed therebeneath and adjacent the infeed side of the gap G. Each component 22 or 23 is of like construction and is preferably of one-piece construction. As seen in FIGS. 6-8, only component 22 is shown and includes a broad, smoothly curved top surface 22a over which the underside of a segment M of the margin or edge of the superposed film sheets is caused to pass prior to said marginal segment entering the gap G.

As seen in FIG. 9, the surface 22a extends from a position substantially beneath the guide roller 16 to a position substantially at the gap G. Thus, compressive force is exerted by each pawl 19 on the marginal segment M of the film for a substantial distance prior to the segment entering the gap G. Thus, by reason of this arrangement, a continuous broad bandlike debossment is formed along each margin of the superposed sheets so as to avoid the possibility of the developing fluid leaking out from between the photographic sheets once the pod containing the fluid has been ruptured and the sheets pass between the spreader members. In various prior constructions, such leakage was a problem due to the fact that the compressive force exerted on the marginal segments was a point contact which occurred a substantial distance ahead of the spreader members and, thus, there was a substantial distance wherein said marginal segment was supported and not subjected to compressive forces. In the instant construction, there is uninterrupted positive compressive force exerted upon the marginal segment over a considerable distance of travel of the segment prior to entering the gap G.

A depending flange 22b is formed adjacent the outer edge of surface 22a. Flange 22b has a portion thereof which extends forwardly of the surface 22a and has formed thereon, a laterally, outwardly extending bearing 22c. A center bore 22d is formed in the bearing and extends through the flange so as to accommodate the spindle 13a of the spreader roller 13, see FIG. 6. The outer end of the bearing is provided with an annular collar 22e which is adapted to engage the outer surface of the arm 14b or 15b of the spring 14 or 15, see FIGS. 1 and 2. As seen in FIG. 6, the end of arm 14b is notched at N to accommodate the bearing 22c. The collar 22e is spaced outwardly from flange 22b so as to accommodate not only the notched end of arm 14b, but also a bifurcated portion 17c of the carriage side flange 17a, see FIG. 6.

The rear, or upstream, portion of the support surface 22a bends downwardly, as seen in FIG. 7, to form a rear wall 22f. A depending lug 22g is formed along the bottom edge of wall 22f and is adapted to be disposed within a suitable opening 17d formed in the base section 17b of the carriage 17. The lug 22a serves to retain the component 22 in a fixed position relative to the carriage.

A studlike projection 22h is also formed on flange 22b and extends outwardly therefrom and is adapted to project through the bifurcated end 17c of the carriage side flange 17a and terminate within an elongated, vertically disposed slot 18 formed adjacent the end of spring arm 14a or 15a, see FIGS. 1 and 2. The elongated configuration of the slot 18 permits relative movement of the spring arms and the spreader rollers 12 and 13 so as to enlarge the height of the gap G, when the film sheets move through the gap, without interference from the ends of the guide roller 16.

The upstream, or rearwardly extending ends of the spring arms 14a and b, or 15a and b, are interconnected by a loop portion 14c or 15c. Each loop portion is riveted at 24, or otherwise secured to the carriage side flange 17a. As a result of the springs 14 and 15 being secured to the carriage flanges, the device 10 is of a unitary construction, thereby making it convenient to handle when being assembled in a camera.

The carriage base section 17b is of skeletal construction so as to reduce weight, and is provided with a rearwardly extending tongue 17d to which is connected a leaf spring 25. The spring 25 is adapted to resiliently engage the film cartridge when the latter is loaded into an interior compartment of a camera, and thus, retain the cartridge in proper position within said compartment.

The carriage base section 17b is provided with a centrally disposed upright projection 17e which is adapted to engage the underside of the superposed film sheets 11, when the latter are being moved through the device. The projection 17e prevents any sagging of the film sheets as the sheets move towards the gap between the spreader rollers.

A forwardly disposed projection 17f is also formed on the carriage base section 17b and serves to align the leading ends E (sometimes referred to as leader tabs) of the film sheets with the infeed side of the gap. The upper surface of the film sheets 11 will engage the underside of the guide roller 16 while the undersurface of the film sheets is engaging the projection 17f.

As aforementioned, the central portion 16a of the guide roller 16 is recessed, and said portion facilitates placement of the elongated feeder tab T, removably attached to the top surface of the film sheets, over the top of the guide roller 16 and the upper spreader roller 12. The feeder tab will extend through a suitable opening formed in the side of the camera and be accessible for manual pulling. Upon the feeder tab being pulled out of the camera side, said feeder tab, in turn, will cause the film sheets to move and the leading ends E thereof to move through the gap and out of the camera housing through a suitable opening formed in the latter. After one of the photographic sheets has been exposed, the superposed film sheets are pulled completely out of the camera housing.

The size of the gap G formed between the spreader rollers, is such that it is less than the thickness of the pod of processing liquid, which is sandwiched between the photographic sheets and thus, said pod will be ruptured when the film is manually pulled through the gap prior to being removed from the camera. Once the pod is ruptured, the spreader rollers 12 and 13 will coact with the superposed sheets and cause the processing liquid to be uniformly spread between the sheets. The compressed marginal segments of the sheets will confine, therebetween, spreading of the liquid.

Thus, it will be seen that an improved device, of the type described, has been provided which is compact, simple, and yet of sturdy construction. The device may be readily used with self-developing film which is currently available on the market. The device will not mar or deface the film as it is moved through the device and will cause to be debossed along opposite marginal segments of the superposed sheets continuous broad bands which will effectively confine the processing liquid therebetween and prevent marginal leakage of said liquid.

We claim:

1. In a camera utilizing a self-developing film wherein the latter is provided with a rupturable pod of processing liquid sandwiched between a pair of superposed photographic sheets, at least one of the sheets carrying a feeder tab; a device positionable within the camera for distributing the processing liquid between the sheets as the latter are moved a predetermined distance through said device, said device comprising a frame, upper and lower elongated spreader members supported on said frame and biased towards one another to assume a substantially parallel superposed relation, means cooperating with said spreader members for maintaining an elongated predetermined minimum gap between said spreader members, said gap being adapted to accommodate the film sheets, and when the latter are moved therethrough, cause rupture of the pod and uniform spreading of the processing liquid between the sheets, guide means supported on said frame and in parallel relationship to said spreader members and disposed adjacent the infeed side of the gap for directing the leading ends of the sheets into the gap and causing the feeder tab to circumvent said gap, and compression means disposed adjacent the infeed side of said gap for engaging opposite marginal segments of the film sheets as the latter move through said gap; said compression means including a pair of elongated pawls disposed at opposite ends of said guide means, each pawl having an elongated opening in slip-fit engagement with an adjacent end portion of said guide means and extending downwardly and forwardly therefrom into said gap, a pair of components supported on said frame adjacent said pawls and extending to the infeed side of said gap, and a coil spring for each pawl encompassing said guide means end portion and having one end of said spring resiliently engaging a forwardly extending portion of said pawl and biasing same towards the adjacent component, the forward terminus of each pawl being disposed within a peripheral groove formed in one of the spreader members and provided with a concave end surface conforming substantially to the peripheral configuration of the base of said groove; said components being adapted to subtend the marginal segments of the film sheets and cooperating with said pawls whereby substantially uninterrupted compressive force is exerted on the marginal segments as the film sheets move from said guide means through said gap and confine the processing liquid between the marginal segments.

2. The device of claim 1 wherein the surface of each pawl engaging a marginal segment of one photographic sheet is elongated and substantially flat, and the surface of each component engaging the corresponding marginal segment of the other photographic sheet is elongated, substantially flat and substantially broader than the flat surface of the adjacent pawl.

* * * * *